US010279661B1

United States Patent
Lansang

(10) Patent No.: US 10,279,661 B1
(45) Date of Patent: May 7, 2019

(54) REMOVABLE CLIP TO SECURE A MALFUNCTIONING VEHICULAR SUN VISOR IN THE DOWNWARD OR UPWARD POSITION FOR A VEHICLE WITH A RIGID ROOF (NON-CONVERTIBLE ROOF)

(71) Applicant: Willie Litonjua Lansang, Artesia, CA (US)

(72) Inventor: Willie Litonjua Lansang, Artesia, CA (US)

( * ) Notice: Subject to any disclaimer, the term of this patent is extended or adjusted under 35 U.S.C. 154(b) by 0 days.

(21) Appl. No.: 15/415,678

(22) Filed: Jan. 25, 2017

Related U.S. Application Data

(63) Continuation-in-part of application No. 14/717,783, filed on May 20, 2015, now abandoned.

(51) Int. Cl.
   *B60J 3/02* (2006.01)
   *F16B 2/22* (2006.01)

(52) U.S. Cl.
   CPC .............. *B60J 3/023* (2013.01); *F16B 2/22* (2013.01)

(58) Field of Classification Search
   CPC ......... Y10T 24/44923; Y10T 24/44932; Y10T 24/205; B60J 3/023; B60J 3/0204; B60R 7/05; F16B 2/22
   USPC ............. 24/563, 336, 338, 67.9, 10 A, 3.12; 224/269, 666
   See application file for complete search history.

(56) References Cited

U.S. PATENT DOCUMENTS

| | | | | |
|---|---|---|---|---|
| 1,513,009 A | * | 10/1924 | Robb | A47C 21/022 24/564 |
| 1,621,008 A | * | 3/1927 | Fricker | B42F 1/06 132/284 |
| 2,323,552 A | * | 7/1943 | Marion | B42F 1/08 24/546 |
| 3,208,792 A | * | 9/1965 | Martin | B60J 3/0208 296/97.6 |
| 3,617,088 A | * | 11/1971 | Graham | B60J 3/0208 296/97.6 |
| D239,147 S | * | 3/1976 | Karlsen | D11/215 |
| 4,317,589 A | * | 3/1982 | Kuss | B60J 3/0208 296/97.6 |
| 4,330,148 A | * | 5/1982 | LaMont | B60J 3/0208 24/561 |
| 4,767,151 A | * | 8/1988 | Agostini | B60J 3/0204 248/301 |
| 5,330,085 A | * | 7/1994 | Horensky | B60R 7/05 224/277 |
| 5,647,106 A | * | 7/1997 | Hogan | E05B 73/0017 24/355 |

(Continued)

*Primary Examiner* — Victor D Batson
*Assistant Examiner* — Rowland Do

(57) ABSTRACT

A sun visor clip assembly for use with a vehicle includes a visor pivotably mounted to the interior roof of the vehicle and a flexible bar member disposed around the visor. The flexible bar member includes a first elongated member, a bend portion directly attached to the first elongated member, a second elongated member directly attached to the bend portion and extending towards the first elongated member. The visor is compressed by the first and second elongated members, thereby securing the flexible bar member to the visor. The first elongated member extends beyond the visor in the downward position adjacent to the windshield of the vehicle or upward position against the interior roof of the vehicle.

10 Claims, 3 Drawing Sheets

(56) References Cited

U.S. PATENT DOCUMENTS

| | | | | |
|---|---|---|---|---|
| 5,697,131 | A | * | 12/1997 | Hunt .......................... B42F 1/06 24/336 |
| D426,183 | S | * | 6/2000 | Brooks, II ................... D12/191 |
| 6,457,218 | B1 | * | 10/2002 | Lawrence ................. B42F 1/10 24/3.12 |
| 7,237,306 | B1 | * | 7/2007 | Flowers .................. A41F 17/02 24/564 |
| 2008/0190975 | A1 | * | 8/2008 | Naughton ................. A45F 5/02 224/269 |

* cited by examiner

REMOVABLE CLIP TO SECURE A MALFUNCTIONING VEHICULAR SUN VISOR IN THE DOWNWARD OR UPWARD POSITION FOR A VEHICLE WITH A RIGID ROOF (NON-CONVERTIBLE ROOF)

RELATED APPLICATION

The application claims priority to non-provisional patent application U.S. Ser. No. 14/717,783 filed on May 20, 2015, the entire contents of which is herein incorporated by reference.

BACKGROUND

The embodiments herein relate specifically to sun visors used in vehicles.

Sun visors used in vehicles such as automobiles and trucks prevent the sun's rays from reaching the driver's eyes and passenger's eyes. The sun visor typically comprises a fabric opaque visor that is pivotably and/or rotatably mounted via a hinge to the vehicle's interior roof proximate the windshield area. The sun visor can be adjusted to the upward position where the visor contacts the interior roof of the vehicle. Alternatively, the visor can be adjusted to the downward position where the visor is adjacent to an upper portion of the vehicle's windshield, thereby blocking sun rays from entering through the windshield and into the driver's and/or passenger's field of sight.

A common problem faced by vehicle drivers worldwide is that the sun visor droops down and fails to remain in the upward position against the interior roof of the vehicle. This can occur either due to a faulty visor hinge and/or wear and ultimate failure of the components such as the hinge. This is problematic because a sun visor that droops down unintentionally is a nuisance to the driver and/or passenger and/or blocks a portion of the driver's view, which is a safety hazard.

As such, there is a need in the industry for a removable clip that allows a user to support a vehicle's sun visor in either the upward position against the interior roof of the vehicle or in a downward position adjacent to the windshield of the vehicle. There is a further need for the removable clip to easily secure to or be removed from the sun visor so that the sun visor may be oriented in the desired position quickly. There is an additional need for the removable clip to be universal and adjustable to work with vehicular sun visors of various makes, models, and years. Extensive research has concluded that there are currently no other automobile accessories on the market that offer a long-term solution for vehicles with rigid roofs as provided by embodiments of the proposed invention. Prior to embodiments of the proposed invention, consumers were limited to choose between expensive dealership repairs/replacements, short-term do-it-yourself attempts which included Velcro, duct tape, safety pins and glue, or removal of the sun visor without replacement due to desperation and frustration.

SUMMARY

A sun visor clip assembly for use with a vehicle to maintain a visor in a downward position adjacent to the windshield of the vehicle or an upward position against an interior roof of the vehicle is provided. The sun visor clip assembly comprises a visor pivotably mounted to the interior roof of the vehicle and a flexible bar member disposed around the visor. The flexible bar member comprises a first elongated member comprising a first end and a second end, a bend portion directly attached to the second end of the first elongated member, a second elongated member comprising a first end and a second end, the first end of the second elongated member directly attached to the bend portion such that the second elongated member extends toward the first elongated member, wherein the visor is disposed within the flexible bar member and compressed by the first and second elongated members, thereby securing the flexible bar member to the visor, wherein the first elongated member extends beyond the visor and is configured to contact a portion of the interior roof of the vehicle to maintain the visor in the downward position adjacent to the windshield of the vehicle or upward position against the interior roof of the vehicle.

BRIEF DESCRIPTION OF THE FIGURES

The detailed description of some embodiments of the invention will be made below with reference to the accompanying figures, wherein the figures disclose one or more embodiments of the present invention.

FIG. 9 depicts an example of a common shape of roof that is curved or angled in regards to windshield placement in contrast to FIG. 10 which shows the roof relatively straight in shape;

FIG. 10 depicts an example of a common shape of roof that is straight in shape in contrast to FIG. 9 which shows a common shape of roof that is curved or angled;

DETAILED DESCRIPTION OF CERTAIN EMBODIMENTS

Figure 1:
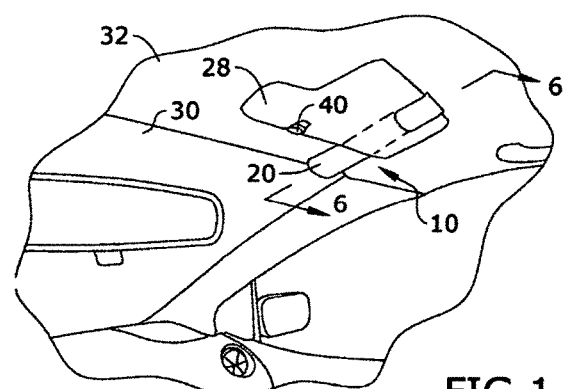
FIG. 1 depicts a perspective view of certain embodiments of the removable clip shown in use to secure the visor in the upward position against the interior roof of the vehicle.
Figure 4:
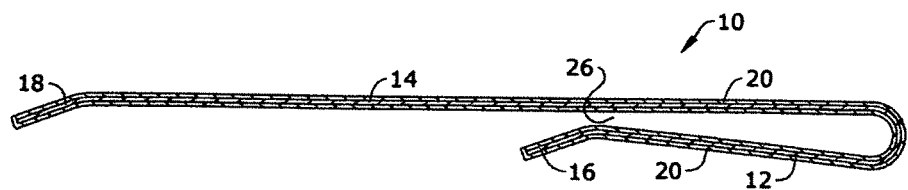
FIG. 4 depicts a section view of certain embodiments of the removable clip, taken along line 4-4 in FIG. 2.
Figure 2:
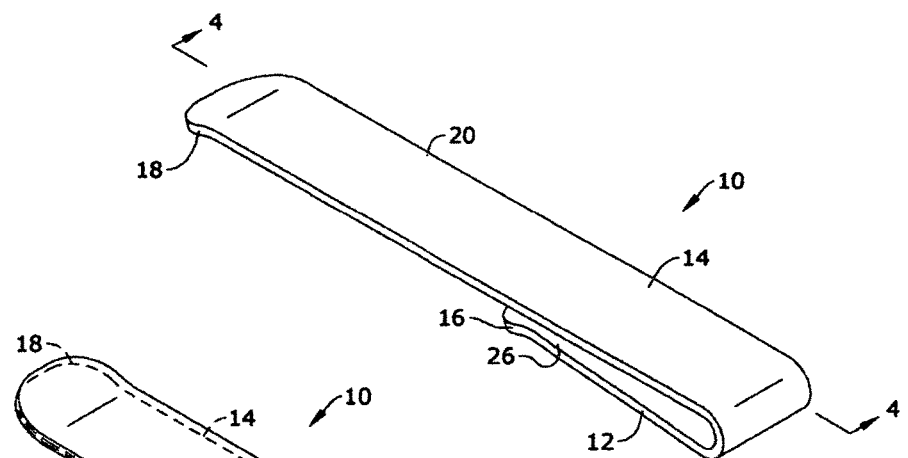
FIG. 2 depicts a perspective view of certain embodiments of the removable clip.
Figure 3:
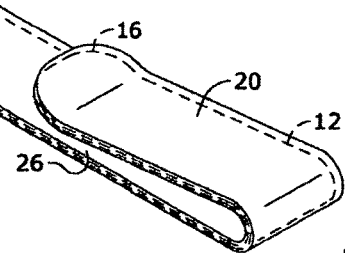
FIG. 3 depicts a perspective view of certain embodiments of the removable clip.
Figure 7:
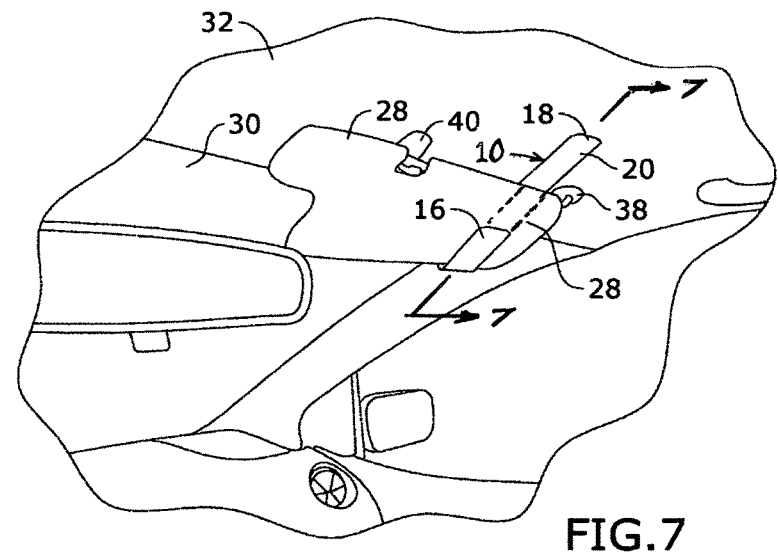
FIG. 7 depicts a perspective view of certain embodiments of the removable clip shown in use to secure the visor in the downward position adjacent to the windshield of the vehicle.

As depicted in FIGS. 1 and/or 7, visor clip 10 is configured for use with visor 28, which is pivotably mounted to interior roof 32 of a vehicle by visor hinge 38 and secured by visor mount 40, Visor hinge 38 and visor mount 40 are positioned near windshield 30 of the vehicle. Visor clip 10 is designed to secure visor 28 in the upward position against interior roof 32 of the vehicle as depicted in FIG. 1, or a downward position adjacent to windshield 30 as depicted in FIG. 7. As depicted in FIGS. 2-4, visor clip 10 comprises short bar 12, long bar 14, short bar leg 16 and long bar leg 18. In one embodiment, outer coating 20 is disposed continuously around the entire surface area of the visor clip 10 Outer coating is for aesthetic purposes only.

Long bar 14 is connected to short bar 12 by a bend portion that comprises a path with a bend of at least 180 degrees. In a preferred embodiment, long bar leg 18, long bar 14, the bend portion, short bar 12 and short bar leg 16 are part of a single component made from a flexible and malleable piece of 16-18 gauge metal such as galvanized steel. However, other metals or alternative materials may be used instead. Slot 26 is formed by the spacing between long bar 14 and short bar 12.

Figure 5:
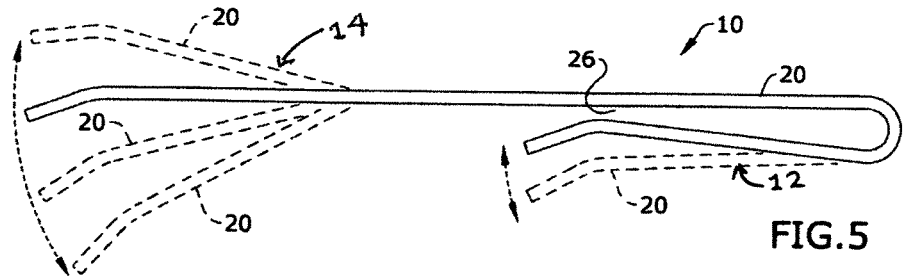
FIG. 5 depicts a side view of certain embodiments of the removable clip and how the clip can be bent differently to accommodate the different interior roof inclinations as shown in FIGS. 6, 8, 9, and 10. In addition it shows how the clip can be bent to accommodate visors of varying thickness.

As depicted in FIG. 5, short bar 12 of visor clip 10 can be easily bent up or down as needed to accommodate different thicknesses of visors 28 and long bar 14 can be easily bent up or down as needed to conform to various shapes of interior roofs of vehicles with rigid roofs, thereby excluding convertibles, of all vehicle makes, models and years. The shape and angle of interior roof 32 determines whether long bar 14 of visor clip 10 is bent up or down. In addition, the depth of visor 28 determines where the bend shall be placed along long bar 14. Specifically, long bar 14 of visor clip 10 is bent up or down to contact a portion of interior roof 32 when in use. Short bar 12 may be bent away from long bar 14 to permit slot 26 to receive a visor with a larger thickness between short and long bars 12, 14.

In a preferred embodiment, the bar member of visor clip 10 comprise a width of approximately 3.81 centimeters, 1½ inches, and a preferred range of 3.4925 centimeters, 1⅜ inches, to 4.1275 centimeters, 1⅝ inches. Long bar 14 comprises an approximate length of 26.67 centimeters, 10½ inches, and a preferred range of 25.4 centimeters, 10 inches, to 27.94 centimeters, 11 inches. Short bar 12 comprises an approximate length of 10.16 centimeters, 4 inches, and a preferred range of 8.89 centimeters, 3½ inches, to 11.43 centimeters, 4½ inches. The bend portion of visor clip 10 comprises an approximate distance of 2.54 centimeters, 1 inch, to 3.175 centimeters, 1¼ inches, between the junction of long bar 14 and the bend portion and the junction of short bar 12 and the bend portion. In the natural state detached from visor 28, visor clip 10 comprises an approximate distance of 0.635 centimeters, ¼ inch, to 1.27 centimeters, ½ inch, between the closest points of short and long bars 12, 14. The overall weight of visor clip 10 is preferably between 141.748 grams, 5 ounces, to 198.447 grams, 7 ounces.

The dimensions of visor clip 10 need to be within the preferred ranges to operate properly so that visor 28 is maintained in the downward or upward positions, In particular, the length of long bar 14 has to be within the preferred range so that the bar extends beyond visor 28 and contacts a portion of interior roof 32. A long bar 14 with a length that is too short would not contact the interior roof 32 and secure visor 28 in place in the downward or upward positions. A long bar 14 with a length that is too long would extend into windshield 30 of the vehicle and obstruct the driver's view. It is noted that visor 28 must be secured in visor mount 40 in order for visor clip 10 to function properly.

Short bar leg 16 and short bar 12 are oriented at an angle of approximately 10-45 degrees relative to each other. This angled positioning of short bar leg 16 creates additional space between short bar leg 16 and long bar 14 to allow visor 28 to slide through with ease to the final position between long bar 14 and short bar 12. Similarly, long bar leg 18 and long bar 14 are oriented at an angle of approximately 10-45 degrees relative to each other.

Outer coating 20 is coated continuously around the entire surface area of visor clip 10. Outer coating is for aesthetic purposes only.

Figure 6:
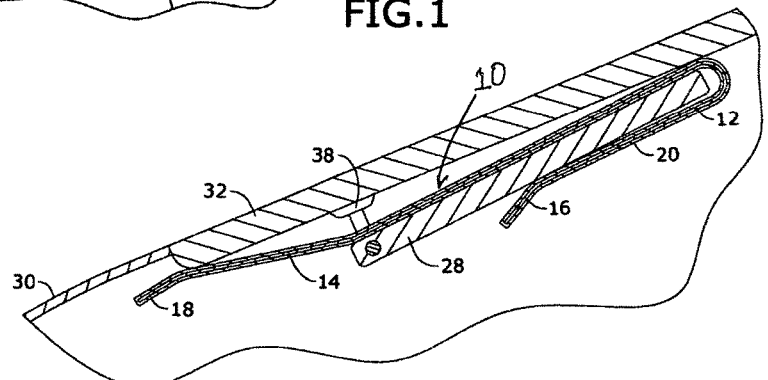
FIG. 6 depicts a section view of certain embodiments of the removable clip, taken along line 6-6 in FIG. 1.
Figure 8:
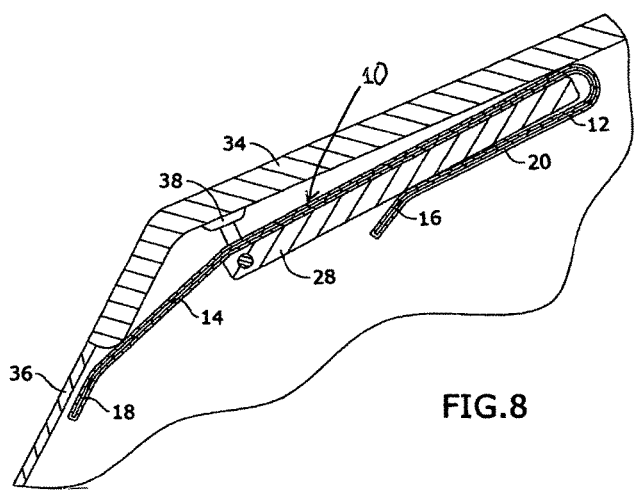
FIG. 8 depicts a section view of certain embodiments of the removable clip shown in use, taken along line 6-6 in FIG. 1.
Figure 9:
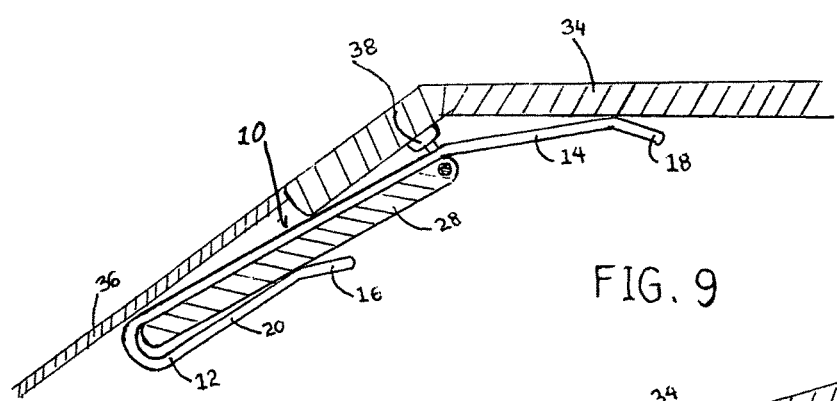
FIG. 9 depicts a section view of certain embodiments of the removable clip shown in use, taken along line 7-7 in FIG. 7, to secure the visor in the downward position adjacent to the windshield.
Figure 10:
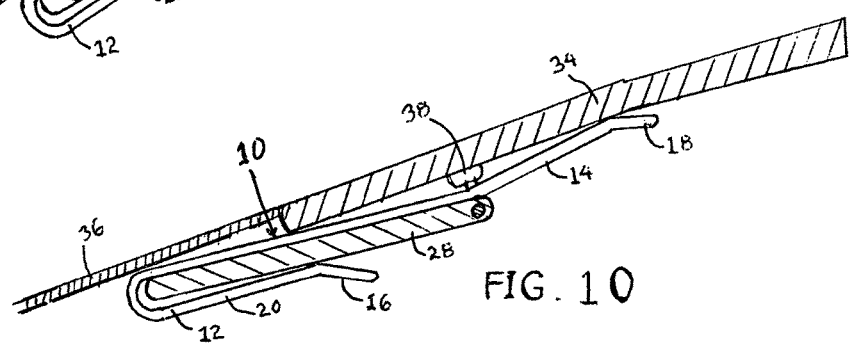
FIG. 10 depicts a section view of certain embodiments of the removable clip shown in use, taken along line 7-7 in FIG. 7, to secure the visor in the downward position adjacent to the windshield.

In operation, visor 28 is inserted within slot 26 of visor clip 10 and compressed between short bar 12 and long bar 14. These compression forces permit short and long bars 12, 14 to securely grip visor 28 therein. Visor clip 10 will maintain visor 28 in the downward or upward positions as desired. Visor 28 must be secured in visor mount 40 so that visor 28 will rotate along the axis created by visor mount 40 and visor hinge 38 into a downward or upward position. As depicted in FIGS. 1 and 6, visor clip 10 maintains visor 28 in the upward position. In this configuration, long bar 14 extends beyond visor 28 and is bent upward to contact a portion of interior roof 32. Any downward gravity force or other manual force applied to visor 28 causes visor 28 to pivot downward and push an opposing portion of long bar 14 into interior roof 32. This contact causes interior roof 32 to apply a counteracting downward force on long bar 14, which causes short bar 12 to push visor 28 upward. These forces maintain visor 28 in the upward position. FIG. 8 depicts alternate interior roof 34 and alternate windshield 36 with different shapes. However, the mechanism of action of visor clip 10 to maintain visor 28 in the upward position is the same. The mechanism of action is similar to the concept of counteracting forces as applied to a see-saw. In this case, interior roof 32 is stationary and applies a constant and sufficient counteracting force to keep the visor 28 in a downward (as depicted in FIGS. 9 and 10) or upward position (as depicted in FIGS. 6 and 8).

FIG. 7 depicts visor clip 10 in an orientation to maintain visor 28 in the downward position. In this configuration, visor clip 10 is inverted and visor 28 is inserted within slot 26. Visor 28 is compressed between short and long bars 12, 14 with long bar 14 extending away from windshield 30. Any downward gravity force or other manual force applied to visor 28 causes visor 28 to pivot downward and push an opposing portion of long bar 14 into interior roof 32. This contact causes interior roof 32 to apply a counteracting downward force on long bar 14 which causes short bar 12 to push visor 28 upward. These forces maintain visor 28 in the downward position.

It shall be appreciated that the components of visor clip 10 described in several embodiments herein may comprise any color. It shall be appreciated that the components of visor clip 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adjustable sun visor clip assembly for use with a vehicle to maintain a malfunctioning visor in a downward position adjacent to the windshield of the vehicle or in an upward position against the interior roof of the vehicle, the sun visor clip assembly comprising: a visor pivotably mounted to the interior roof of the vehicle; a flexible bar member disposed around the visor, the flexible bar member comprising: a first elongated member comprising a first end and a second end; a bend portion directly attached to the second end of the first elongated member; a second elongated member comprising a first end and a second end, the first end of the second elongated member directly attached to the bend portion such that the second elongated member extends toward the first elongated member; wherein the visor is disposed within the flexible bar member and compressed by the first and second elongated members, thereby securing the flexible bar member to the visor, wherein the first elongated member extends beyond the visor and is configured to contact a portion of the interior roof of the vehicle to selectively maintain the visor in the downward position adjacent to the windshield of the vehicle and in the upward position against the interior roof of the vehicle.

2. The sun visor clip assembly of claim 1, further comprising a first leg directly attached to the first end of the first elongated member and inclined towards the second elongated member and a second leg directly attached to the second end of the second elongated member and inclined away from the first elongated member.

3. The sun visor clip assembly of claim 2, wherein the first leg extends generally within a first plane and the second leg extends generally within a second plane.

4. The sun visor clip assembly of claim 3, wherein the flexible bar member comprises a width of approximately 3.4925 centimeters to 4.1275 centimeters (1⅜ inches to 1⅝ inches).

5. The sun visor clip assembly of claim 4, wherein the first elongated member comprises a length of approximately 25.4 centimeters to 27.94 centimeters (10 inches to 11 inches).

6. The sun visor clip assembly of claim 5, wherein the second elongated member comprises a length of approximately 8.89 centimeters to 11.43 centimeters, (3½ inches to 4½ inches).

7. The sun visor clip assembly of claim 6, further comprising an outer coating disposed continuously around the surface area of the visor clip, wherein the outer coating is for aesthetic purposes only.

8. The sun visor clip assembly of claim 7, wherein a first angle defined by a longitudinal axis of the first elongated member and a longitudinal axis of the first leg is approximately 10 to 45 degrees.

9. The sun visor clip assembly of claim 8, wherein a second angle defined by a longitudinal axis of the second elongated member and a longitudinal axis of the second leg is approximately 10 to 45 degrees.

10. The sun visor clip assembly of claim 9, wherein the flexible bar member is made from 16-18 gauge metal.

* * * * *